M. GOHLKE.
METHOD OF FORMING BALL HOLDERS FOR BALL CAGES.
APPLICATION FILED NOV. 25, 1910.
1,031,844.
Patented July 9, 1912.
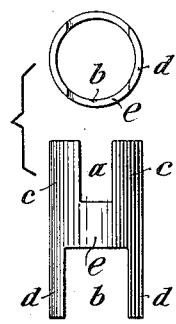
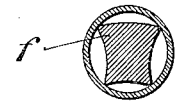
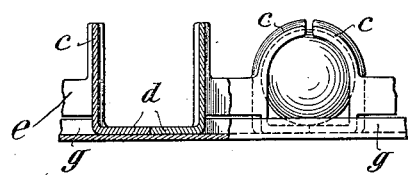
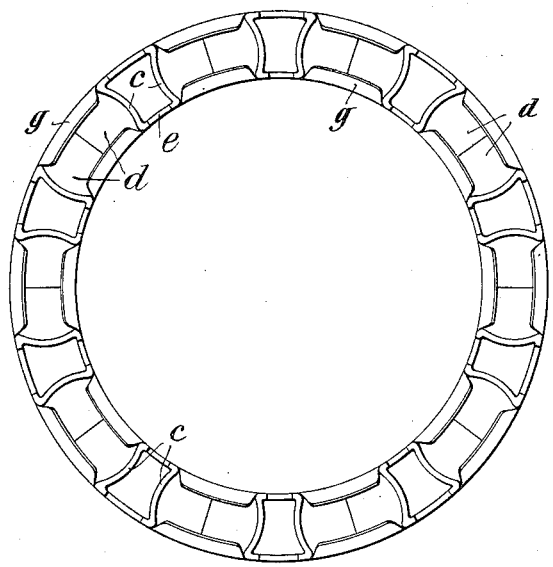
WITNESSES:
INVENTOR:
Max Gohlke,
By Attorneys,

UNITED STATES PATENT OFFICE.

MAX GOHLKE, OF PANKOW, NEAR BERLIN, GERMANY, ASSIGNOR TO DEUTSCHE WAFFEN- UND MUNITIONS-FABRIKEN, OF BERLIN, GERMANY.

METHOD OF FORMING BALL-HOLDERS FOR BALL-CAGES.

1,031,844.   Specification of Letters Patent.   Patented July 9, 1912.

Application filed November 25, 1910. Serial No. 593,998.

*To all whom it may concern:*

Be it known that I, MAX GOHLKE, engineer, a subject of the German Emperor, residing at Nos. 5-6 Florastrasse, Pankow, near Berlin, in the Empire of Germany, have invented certain new and useful Improvements in Methods of Forming Ball-Holders for Ball-Cages, of which the following is a full, clear, and exact description.

This invention relates to such sheet metal cages for ball bearings wherein the balls are held by means of ball holders secured to a common ring. These ball holders are constructed as intermediate pieces and so arranged that intermediate pieces and ball guide chambers are formed alternately the balls being guided in the latter by bending back the flap-like side walls of the intermediate pieces. To avoid an automatic bending back or pressing together of the intermediate pieces it is necessary that the latter should possess a certain degree of stiffness. This is secured according to the present invention by causing the intermediate pieces to form a self-contained body, that is to say, the side walls of the intermediate pieces, which are constructed as guiding flaps, and the cross pieces which connect the intermediate pieces, form a connected whole.

The invention relates especially to the manufacture of such intermediate pieces.

The method of manufacture is shown by way of example in the accompanying drawing.

Figure 1 shows the intermediate piece in its first stage of manufacture, such intermediate piece consisting of tubing for ball bearings which is provided with incisions. Fig. 2 is a cross-section through the mandrel around which the body according to Fig. 1 is pressed. Fig. 3 shows the intermediate pieces in section and elevation and in an open and folded state. Fig. 4 is a view of the cage ready for insertion in the bearing.

The method of manufacture is as follows: A tubular section (Fig. 1) is provided with incisions $a$ and $b$ in such a manner that flaps $c$ and $d$ and cross-pieces $e$ are formed. The tubular section thus formed is pressed over a profile-mandrel, as shown in Fig. 2, and thus receives the shape required for the purpose as ball holder. The flaps $d$ which serve for securing the intermediate piece on the common supporting ring $g$ are then bent at right angles, as shown in Fig. 3, and the intermediate pieces with the flaps $d$ are secured to a common supporting ring, Fig. 4, in any suitable manner. The cage may now be inserted in the bearing and the flaps $c$ bent around the balls in the known manner. It is obvious that the procedure can be simplified by simultaneously carrying out some working phases.

What I claim as my invention and desire to secure by Letters Patent is:—

1. The method of forming ball holders for ball cages of ball bearings, which includes slitting the ends of short tubular pieces of metal, and bending the slitted end portions outwardly to form ball engaging arms and arms for connecting the ball-holders to a common ring respectively.

2. The method of forming ball holders for ball cages of ball bearings, which includes cutting said ball holders from a piece of tubing having a plurality of longitudinal incisions therein with the incisions in either end of the severed part and bending the slitted end portions outwardly to form engaging arms for the balls and a common ring respectively.

3. The method of forming ball holders for ball cages of ball bearings, which includes impressing upon a tube provided with incisions in both ends a shape corresponding to the arcs of a circle to form spacing abutments and bending the slitted end portions of said tube outwardly to form arms for engaging the balls and a common ring respectively.

In witness whereof, I have hereunto signed my name in the presence of two subscribing witnesses.

MAX GOHLKE.

Witnesses:
 ROBERT MICHALSKI,
 HENRY HASPER.

Copies of this patent may be obtained for five cents each, by addressing the "Commissioner of Patents, Washington, D. C."